United States Patent
Ikeno et al.

(10) Patent No.: US 7,067,570 B2
(45) Date of Patent: Jun. 27, 2006

(54) ONE-PART ORGANOPOLYSILOXANE GEL COMPOSITION

(75) Inventors: Masayuki Ikeno, Maebashi (JP); Miyuki Tanaka, Annaka (JP); Kazuyasu Sato, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 30 days.

(21) Appl. No.: 10/730,079

(22) Filed: Dec. 9, 2003

(65) Prior Publication Data

US 2004/0116561 A1 Jun. 17, 2004

(30) Foreign Application Priority Data

Dec. 10, 2002 (JP) .............................. 2002-358629

(51) Int. Cl.
*C08K 5/51* (2006.01)

(52) U.S. Cl. ................. 524/121; 524/128; 524/147; 524/153; 524/588; 524/268; 528/15; 528/24; 528/31; 528/42; 428/405

(58) Field of Classification Search ................. 528/15, 528/23, 24, 31, 32; 524/710
See application file for complete search history.

(56) References Cited

U.S. PATENT DOCUMENTS

| 3,188,300 A | 6/1965 | Chalk |
| 3,445,420 A | 5/1969 | Kookootsedes et al. |
| 3,453,234 A | 7/1969 | Kookootsedes |
| 3,715,334 A | 2/1973 | Karstedt |
| 4,061,609 A | 12/1977 | Bobear |
| 4,329,275 A | 5/1982 | Hatanaka et al. |
| 4,487,906 A * | 12/1984 | Kniege et al. ................ 528/15 |
| 4,584,361 A | 4/1986 | Janik et al. |
| 6,300,455 B1 | 10/2001 | Haselhorst et al. |
| 6,346,562 B1 | 2/2002 | Haselhorst et al. |

FOREIGN PATENT DOCUMENTS

| EP | 0 662 490 | 7/1995 |
| EP | 761759 A2 * | 3/1997 |
| JP | 56-20050 | 2/1981 |

OTHER PUBLICATIONS

"Silicones, An Introduction to Their Chemistry and Applications" Freeman, Chapel River Press, 1962.*
Hawleys Condensed Chemical Dictionary, 14th edition.*

* cited by examiner

Primary Examiner—Marc S Zimmer
(74) Attorney, Agent, or Firm—Oblon, Spivak, McClelland, Maier & Neustadt, P.C.

(57) ABSTRACT

A one-part polysiloxane composition comprising a branched organopolysiloxane with vinyl groups bonded to silicon atoms, an organohydrogenpolysiloxane with at least two hydrogen atoms bonded to molecular chain terminal silicon atoms within each molecule, and a platinum based catalyst, together with an additional phosphite triester and an organic peroxide, is resistant to increases in viscosity, and does not gel, even on extended storage at room temperature. Even after storage, the characteristics of the cured gel product are unchanged. Accordingly, a composition of the present invention offers excellent long term storage stability at room temperature.

12 Claims, No Drawings

ОNE-PART ORGANOPOLYSILOXANE GEL COMPOSITION

BACKGROUND OF THE INVENTION

1. Field of the Invention

The present invention relates to a one-part organopolysiloxane gel composition, and more particularly to a one-part organopolysiloxane gel composition that displays favorable long term storage stability at room temperature.

2. Description of the Prior Art

In an addition reaction curing type organopolysiloxane composition (hereafter simply referred to as "the composition") comprising an organohydrogenpolysiloxane containing hydrogen atoms bonded to silicon atoms (SiH groups), an organopolysiloxane containing alkenyl groups such as vinyl groups bonded to silicon atoms, and a platinum based catalyst, which is converted to a cured product through an addition reaction of the above SiH groups to the vinyl groups (a hydrosilylation reaction), it is already known that by adding any of a variety of addition reaction inhibitors together with the platinum based catalyst, the addition reaction curing process can be inhibited at room temperature, enabling an improvement in the long term storage stability, and that by then heating the composition at the time of use, the addition reaction can be accelerated, enabling curing to take place. Examples of known addition reaction inhibitors include acetylene based compounds (U.S. Pat. No. 3,445,420), sulfoxide compounds (U.S. Pat. No. 3,453,234), and hydroperoxide compounds (U.S. Pat. No. 4,061,609).

However, in compositions comprising an organohydrogenpolysiloxane with a monofunctional unit represented by the formula $H(CH_3)_2SiO_{0.5}$, namely, an organohydrogenpolysiloxane with a SiH group at a molecular chain terminal, even if an addition reaction inhibitor such as those described above is added, the addition reaction curing of the composition cannot be effectively inhibited at room temperature, meaning the storage stability of the composition is unsatisfactory. Furthermore, in the case of compositions that combine an aforementioned organohydrogenpolysiloxane with a SiH group at a molecular chain terminal, with an alkenyl group containing organopolysiloxane with a branched structure, achieving long term storage stability at room temperature is even more difficult.

In order to resolve these problems, U.S. Pat. No. 4,584,361 discloses the use of amine compounds such as n-butylamine, N,N-dibutylaminopropylamine and N,N,N',N'-tetramethylethylenediamine as inhibitors for the room temperature addition reaction of compositions comprising a branched organopolysiloxane containing vinyl groups and an organohydrogenpolysiloxane with a SiH group at a molecular chain terminal. However, because these amine compounds have low boiling points, the storage stability deteriorates in open systems, and furthermore, if the composition also contains inorganic fillers, then the amine compounds tend to adsorb to the surface of these inorganic fillers, causing a marked reduction in the addition reaction inhibiting effect, and these types of drawbacks have limited the effectiveness of such compositions.

Compositions containing a phosphite ester as the addition reaction inhibitor have also been disclosed in U.S. Pat. No. 3,188,300, Published Japanese translations of PCT international publication (kohyo) No. 2001-508096 (JP2001-508096A) (US counterpart: U.S. Pat. No. 6,300,455), and Published Japanese translations of PCT international publication (kohyo) No. 2001-527111 (JP2001-527111A) (US counterpart: U.S. Pat. No. 6,346,562), whereas Japanese Laid-open publication (kokai) No. Sho 56-20051 (US counterpart: U.S. Pat. No. 4,329,275) discloses the use of a phosphorus compound and an organic peroxide as the addition reaction inhibitor. However in the above publications, no mention is made of the use of a phosphite ester as an addition reaction inhibitor capable of effectively inhibiting the room temperature addition reaction in a composition comprising an organohydrogenpolysiloxane with a SiH group at a molecular chain terminal. In addition, in the case of compositions comprising a combination of an organohydrogenpolysiloxane with a SiH group at a molecular chain terminal, and an alkenyl group containing organopolysiloxane with a branched structure, absolutely no mention is made of the fact that the addition reaction at room temperature can be effectively inhibited using either a phosphite ester, or a combination of a phosphite ester and an organic peroxide.

SUMMARY OF THE INVENTION

Accordingly, an object of the present invention is to provide a one-part organopolysiloxane gel composition, for which the addition reaction is effectively inhibited at room temperature, and the storage stability can be maintained for extended periods, even in cases in which the composition comprises a combination of an organohydrogenpolysiloxane with a SiH group at a molecular chain terminal, and an alkenyl group containing organopolysiloxane with a branched structure, and even in cases in which the composition also comprises an added inorganic filler.

As a result of intensive investigations aimed at resolving the problems described above, the inventors of the present invention were able to complete the present invention.

In other words, the present invention provides a one-part organopolysiloxane gel composition comprising:

(A) 100 parts by weight of an organopolysiloxane comprising from 80.0 to 97.0 mol % of $R(CH_3)SiO$ units, from 1.0 to 10.0 mol % of $RSiO_{1.5}$ units, from 0.1 to 4.0 mol % of $(CH_3)_2(CH_2=CH)SiO_{0.5}$ units, and from 0.5 to 10 mol % of $(CH_3)_3SiO_{0.5}$ units [wherein, the total of these units is 100 mol %, and in each of the unit formulas representing the units, R represents a methyl group, a phenyl group, or a group represented by a formula $RfCH_2CH_2$— (wherein Rf is a perfluoroalkyl group that contains or does not contain an ether linkage-forming oxygen atom within the chain)], in which the plurality of R groups within a single molecule are either the same or different;

(B) an organohydrogenpolysiloxane having at least two units represented by a formula $H(R^1)_2SiO_{0.5}$ within each molecule [wherein, each $R^1$ represents, independently, an unsubstituted or substituted monovalent hydrocarbon group other than an alkenyl group], in sufficient quantity that the number of hydrogen atoms bonded to silicon atoms within this component is within a range from 0.5 to 4.0 atoms for each vinyl group within the organopolysiloxane of the component (A);

(C) an effective quantity of a platinum based catalyst;

(D) a phosphite triester in sufficient quantity to provide at least 2 equivalents relative to the platinum metal atoms within the component (C); and (E) an organic peroxide in sufficient quantity to provide at least 2 equivalents relative to the component (D).

DETAILED DESCRIPTION OF THE PREFERRED EMBODIMENTS

As follows is a more detailed description of the present invention.

(A) Vinyl Group Containing Branched Organopolysiloxane

An organopolysiloxane of the component (A) is used as the primary component (the base polymer) of a composition of the present invention, and as described above, is formed from 80.0 to 97.0 mol % of $R(CH_3)SiO$ units, from 1.0 to 10.0 mol % of $RSiO_{1.5}$ units, from 0.1 to 4.0 mol % of $(CH_3)_2(CH_2=CH)SiO_{0.5}$ units, and from 0.5 to 10 mol % of $(CH_3)_3SiO_{0.5}$ units (wherein the total of these units is 100 mol %).

The R groups may be either the same or different, and each R represents a methyl group, a phenyl group, or a group represented by a formula $RfCH_2CH_2—$ (wherein Rf is a perfluoroalkyl group that contains or does not contain an ether linkage-forming oxygen atom within the chain).

In those cases in which the perfluoroalkyl group of Rf does not contain an ether linkage-forming oxygen atom within the chain, the number of carbon atoms within the group is preferably from 1 to 12, and even more preferably from 1 to 8. Specific examples of the Rf group in this case include the groups represented by the formulas $CF_3—$, $C_4F_9—$, and $C_8F_{17}—$.

In those cases in which the Rf group does contain an ether linkage-forming oxygen atom within the chain, the group can be represented by a general formula (1) shown below.

$$R'O—(R''O—)_pR'''— \quad (1)$$

[wherein, R' represents a perfluoroalkyl group of 1 to 4 carbon atoms, R" and R'" each represent, independently, a perfluoroalkylene group of 1 to 3 carbon atoms, and p represents an integer of 0 to 10]

Specific examples include the groups represented by the formulas shown below.

$$C_2F_5O—(CF_2CF_2O—)_sCF_2—$$

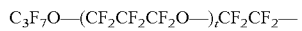
$$C_3F_7O—(CF_2CF_2CF_2O—)_tCF_2CF_2—$$

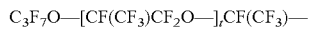
$$C_3F_7O—[CF(CF_3)CF_2O—]_tCF(CF_3)—$$

[wherein, s represents an integer from 0 to 4, and t represents an integer from 0 to 10]

The trifunctional units represented by the aforementioned formula $RSiO_{1.5}$ within the component (A) of the present invention ensure that the organopolysiloxane of the component (A) has a branched structure, and are also very important units in terms of imparting favorable low temperature characteristics and rapid curing performance to the composition of the present invention. As described above, the content of these units within the component (A) is within a range from 1.0 to 10.0 mol %, and preferably from 1.5 to 10.0 mol %. If the content is less than 1.0 mol %, then because the proportion of straight chain structures within the component (A) increases, the aforementioned characteristics and performance imparted by the trifunctional units tend to be unsatisfactory, whereas if the content exceeds 10.0 mol %, control of the viscosity becomes a problem.

The monofunctional units represented by the aforementioned formulas $(CH_3)_2(CH_2=CH)SiO_{0.5}$ and $(CH_3)_3SiO_{0.5}$ both represent terminal groups. The content of the former unit is within a range from 0.1 to 4.0 mol %, and preferably from 0.5 to 3.0 mol %. If the content is less than 0.1 mol %, then the addition reaction curing characteristics deteriorate, whereas if the content exceeds 4.0 mol %, the heat resistance of the cured product tends to deteriorate. The content of the latter unit is within a range from 0.5 to 10 mol %, and preferably from 0.8 to 8 mol %, and the combined content of the former and the latter units is determined by the content of the trifunctional units represented by the above formula $RSiO_{1.5}$ (in other words, the proportion of branched structures within the component (A)).

The organopolysiloxane of the component (A) can be produced using conventional methods. Suitable methods include a method in which the chlorosilanes corresponding with each of the above units are mixed together in the required molar ratio, and are then subjected to a cohydrolysis and a condensation, or a method in which the organopolysiloxane is produced by an equilibration reaction of polysiloxanes and/or cyclic siloxane compounds containing each of the above unit structures.

This organopolysiloxane of the component (A) typically has a viscosity at 25° C. that falls within a range from 300 to 10,000 mPa·s.

As follows is a list of specific examples of the organopolysiloxane of the component (A), although this is in no way a restrictive list.

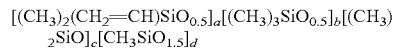
$$[(CH_3)_2(CH_2=CH)SiO_{0.5}]_a[(CH_3)_3SiO_{0.5}]_b[(CH_3)_2SiO]_c[CH_3SiO_{1.5}]_d$$

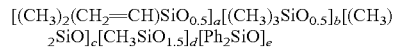
$$[(CH_3)_2(CH_2=CH)SiO_{0.5}]_a[(CH_3)_3SiO_{0.5}]_b[(CH_3)_2SiO]_c[CH_3SiO_{1.5}]_d[Ph_2SiO]_e$$

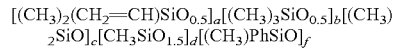
$$[(CH_3)_2(CH_2=CH)SiO_{0.5}]_a[(CH_3)_3SiO_{0.5}]_b[(CH_3)_2SiO]_c[CH_3SiO_{1.5}]_d[(CH_3)PhSiO]_f$$

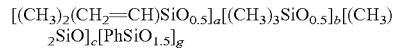
$$[(CH_3)_2(CH_2=CH)SiO_{0.5}]_a[(CH_3)_3SiO_{0.5}]_b[(CH_3)_2SiO]_c[PhSiO_{1.5}]_g$$

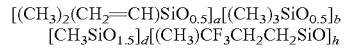
$$[(CH_3)_2(CH_2=CH)SiO_{0.5}]_a[(CH_3)_3SiO_{0.5}]_b[CH_3SiO_{1.5}]_d[(CH_3)CF_3CH_2CH_2SiO]_h$$

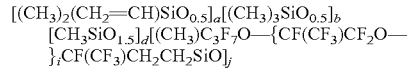
$$[(CH_3)_2(CH_2=CH)SiO_{0.5}]_a[(CH_3)_3SiO_{0.5}]_b[CH_3SiO_{1.5}]_d[(CH_3)C_3F_7O—\{CF(CF_3)CF_2O—\}_iCF(CF_3)CH_2CH_2SiO]_j$$

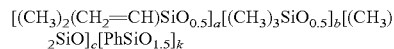
$$[(CH_3)_2(CH_2=CH)SiO_{0.5}]_a[(CH_3)_3SiO_{0.5}]_b[(CH_3)_2SiO]_c[PhSiO_{1.5}]_k$$

(wherein in each of the above formulas, a, b, c, d, e, f, g, h, i, j, and k each represent positive integers selected so as to satisfy the above viscosity range, and Ph represents a phenyl group ($C_6H_5$).)

These organopolysiloxanes can be used singularly, or in combinations of two or more different materials.

(B) Organohydrogenpolysiloxane

An organohydrogenpolysiloxane of the component (B) is a material that comprises at least two monofunctional diorganohydrogensiloxy units represented by a formula $H(R^1)_2SiO_{0.5}$ within each molecule. [wherein, each $R^1$ represents, independently, an unsubstituted or substituted monovalent hydrocarbon group other than an aliphatic unsaturated group]. In other words, this organohydrogenpolysiloxane comprises at least two hydrogen atoms bonded to molecular terminal silicon atoms.

The $R^1$ group is preferably an unsubstituted or substituted monovalent hydrocarbon group of 1 to 12 carbon atoms, and even more preferably 1 to 8 carbon atoms. Specific examples include alkyl groups such as methyl groups, ethyl groups, propyl groups, and butyl groups; cycloalkyl groups such as cyclohexyl groups; aryl groups such as phenyl groups and tolyl groups; aralkyl groups such as benzyl groups and β-phenylpropyl groups; as well as groups in which either a portion of, or all of, the hydrogen atoms bonded to carbon atoms within the aforementioned groups have been substituted with halogen atoms or cyano groups or the like, such as chloromethyl groups, 3,3,3-trifluoropropyl groups, and 2-cyanoethyl groups. Of these, methyl groups, phenyl groups, and 3,3,3-trifluoropropyl groups are preferred.

This organohydrogenpolysiloxane can be represented, for example, by the average composition formula (2) shown below, $$(H)_a(R^6)_b SiO_{(4-a-b)/2} \quad (2)$$

and must also contain at least two units represented by the formula $H(R^1)_2 SiO_{0.5}$ (wherein $R^1$ is as described above) within each molecule.

In the above average composition formula (2), the plurality of $R^6$ groups, each represent, independently, the same type of unsubstituted or substituted monovalent hydrocarbon group defined in relation to the group $R^1$. Two $R^6$ groups may also combine to form a lower alkylene group.

In those cases in which an $R^6$ group is an unsubstituted or substituted monovalent hydrocarbon group, suitable examples of the group include the same as those described above in relation to $R^1$, and of these groups, methyl groups, phenyl groups, and 3,3,3-trifluoropropyl groups are preferred.

Furthermore, examples of suitable lower alkylene groups formed through the combination of two $R^6$ groups include ethylene groups, trimethylene groups, methylmethylene groups, tetramethylene groups, and hexamethylene groups.

Furthermore, in the above average composition formula (2), a is a number that satisfies $0<a \leq 2$, b is a number that satisfies $0<b \leq 3$, and $O<a+b<3$, although preferably $0.001 \leq a \leq 0.5$, $0.8 \leq b \leq 2.2$, and $1 \leq a+b \leq 2.4$.

There are no particular restrictions on the organohydrogenpolysiloxane represented by the above average composition formula (2), provided the material contains at least two units represented by the formula $H(R^1)_2 SiO_{0.5}$ within each molecule, and both straight chain and branched chain structures are acceptable.

Furthermore, for reasons including ease of synthesis, the organohydrogenpolysiloxane of the component (B) preferably has a viscosity at 25° C. of no more than 1,000 mPa·s, and typically within a range from 0.1 to 1,000 mPa·s, and most preferably from 0.5 to 500 mPa·s.

In those cases in which the component (B) is a straight chain organohydrogenpolysiloxane, it can be represented by a general formula (3) shown below.

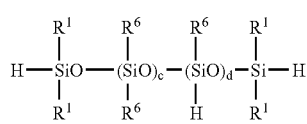

(3)

(wherein, $R^1$ and $R^6$ are as defined above, c and d may be the same or different, and each represents either 0 or a positive number, although c+d must be a number that satisfies the above viscosity requirements.)

In cases in which the component (B) is a branched chain organohydrogenpolysiloxane, the material comprises branching sources such as units represented by the formula $R^6 SiO_{1.5}$ (wherein $R^6$ is as defined above), units represented by the formula $SiO_2$, or units represented by a structural formula (4) shown below.

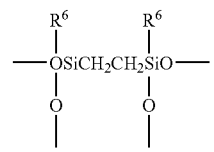

(4)

(wherein, $R^6$ is as defined above)

Specific examples of the organohydrogenpolysiloxane of the component (B) are shown below, although this is in no way a restrictive list.

Dimethylpolysiloxane with both molecular chain terminals terminated with dimethylhydrogensiloxy groups, methylphenylpolysiloxane with both molecular chain terminals terminated with dimethylhydrogensiloxy groups, copolymers of dimethylsiloxane and methylphenylsiloxane with both molecular chain terminals terminated with dimethylhydrogensiloxy groups, copolymers of dimethylsiloxane and methylhydrogensiloxane with both molecular chain terminals terminated with dimethylhydrogensiloxy groups, copolymers of dimethylsiloxane, methylhydrogensiloxane and methylphenylsiloxane with both molecular chain terminals terminated with dimethylhydrogensiloxy groups, copolymers of dimethylsiloxane and methyltrifluoropropylsiloxane with both molecular chain terminals terminated with dimethylhydrogensiloxy groups, organopolysiloxane copolymers formed from siloxane units represented by the formula $R^1_3 SiO_{0.5}$, siloxane units represented by the formula $R^1_2 HSiO_{0.5}$, and siloxane units represented by the formula $SiO_2$, organopolysiloxane copolymers formed from siloxane units represented by the formula $R^1_2 HSiO_{0.5}$ and siloxane units represented by the formula $SiO_2$, organopolysiloxane copolymers formed from siloxane units represented by the formula $R^1_2 HSiO_{0.5}$ and siloxane units represented by the formula $R^1 SiO_{1.5}$, and organopolysiloxane copolymers formed from siloxane units represented by the formula $R^1_2 HSiO_{0.5}$, siloxane units represented by the formula $R^1_2 SiO$ and siloxane units represented by the formula $R^1 SiO_{1.5}$ (wherein in each of the above formulas, $R^1$ is as defined above).

The organohydrogenpolysiloxanes can be used singularly, or in combinations of two or more different materials.

In order to ensure that the final cured product displays favorable physical characteristics including heat resistance and mechanical strength, and that the composition does not foam during curing, the proportion of the component (B) within a composition of the present invention is preferably adjusted so that the number of hydrogen atoms bonded to silicon atoms within the component (B) is within a range from 0.5 to 4.0 atoms, and even more preferably from 0.8 to 3.0 atoms, for each vinyl group within the organopolysiloxane of the component (A).

(C) Platinum Based Catalyst

The platinum based catalyst of the component (C) accelerates the addition reaction between the vinyl groups of the component (A) and the SiH groups of the component (B), and is a conventionally known component that is added to enable a cured product of the present invention to be obtained.

This component (C) is preferably a platinum complex that comprises a vinyl group containing organopolysiloxane as the ligands, wherein these ligands have structures such as those represented by either a general formula (5) shown below:

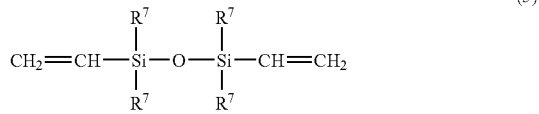
(5)

or a general formula (6) shown below:

(6)

[wherein in each of the above formulas, each $R^7$ represents, independently, an unsubstituted or substituted monovalent hydrocarbon group, m is an integer from 0 to 3, n is an integer from 3 to 6, and the sum m+n is an integer from 3 to 9].

The above $R^7$ groups are preferably unsubstituted or substituted monovalent hydrocarbon groups of 1 to 12 carbon atoms, and even more preferably 1 to 8 carbon atoms, and specific examples include alkyl groups such as methyl groups, ethyl groups, propyl groups, and butyl groups; alkenyl groups such as vinyl groups, allyl groups and propenyl groups; cycloalkyl groups such as cyclohexyl groups; aryl groups such as phenyl groups and tolyl groups; aralkyl groups such as benzyl groups and β-phenylpropyl groups; as well as groups in which either a portion of, or all of, the hydrogen atoms bonded to carbon atoms within the aforementioned groups have been substituted with halogen atoms or cyano groups or the like, such as chloromethyl groups, 3,3,3-trifluoropropyl groups, and 2-cyanoethyl groups. Of these, methyl groups, vinyl groups, phenyl groups, and 3,3,3-trifluoropropyl groups are preferred.

This platinum complex of the component (C) is a known material, and as disclosed in Japanese Post-Examination Patent publication (kokoku) No. Sho 47-23679 (US counterpart: U.S. Pat. No. 3,715,334), can be prepared by a heated reaction of chloroplatinic acid with a low molecular weight siloxane such as those represented by the general formulas (5) and (6) above, in the presence of a basic salt.

Specific examples of the platinum based catalyst of the component (C) of the present invention include a complex of platinum and 1,3-divinyl-1,1,3,3-tetramethyldisiloxane, and a complex of platinum and 2,4,6,8-tetramethyl-2,4,6,8-tetravinylcyclotetrasiloxane, although this is in no way a restrictive list.

The platinum based catalyst can utilize either a single material, or a combination of two or more catalysts.

There are no particular restrictions on the quantity of the component (C) used in a composition of the present invention, which need only be an effective catalytic quantity, although a typical quantity, calculated as the weight of the platinum metal atoms within the composition relative to the combined weight of the component (A) and the component (B), is within a range from 0.5 to 500 ppm, and preferably from 1 to 100 ppm, and even more preferably from 5 to 50 ppm. If the quantity of the catalyst is too low, then either the addition reaction rate slows markedly, or curing may not occur at all, whereas in contrast, if the quantity is too large, the heat resistance of the cured polysiloxane composition deteriorates, and the composition becomes unfavorable from a cost perspective, due to the high cost of the platinum.

(D) Phosphite Triester

The component (D) is a phosphite triester which is preferably a compound represented by a general formula:

$P(OR^2)_3$

[wherein, each $R^2$ represents, independently, at least one group selected from the group consisting of unsubstituted and substituted monovalent hydrocarbon groups, and groups of a formula —$R^4$—[—O—$P(OR^3)_2]_x$ (wherein $R^3$ are each independently an unsubstituted or substituted monovalent hydrocarbon group, x is an integer of 1 to 3, and $R^4$ is a bivalent, trivalent or tetravalent hydrocarbon group of 2 to 20 carbon atoms that contains or does not contain an ether linkage-forming oxygen atom within the chain)], or a compound represented by a general formula:

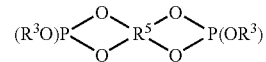

[wherein $R^3$ are as defined above, and $R^5$ is a tetravalent hydrocarbon group of 1 to 20 carbon atoms that contains or does not contain an ether linkage-forming oxygen atom within the chain)].

represented by a general formula $P(OR^2)_3$

[wherein, each $R^2$ represents, independently, at least one group selected from a group consisting of unsubstituted and substituted monovalent hydrocarbon groups, and groups of a formula —$R^4$—O—$P(OR^3)_2$ (wherein $R^3$ are each independently an unsubstituted or substituted monovalent hydrocarbon group, and $R^4$ is a bivalent hydrocarbon group of 2 to 20 carbon atoms that contains or does not contain an ether linkage-forming oxygen atom within a chain)].

This component (D) has the function of inhibiting the catalytic activity of the aforementioned platinum based catalyst of the component (C) on the addition reaction at room temperature.

The $R^2$ group is preferably an unsubstituted or substituted monovalent hydrocarbon group of 1 to 20 carbon atoms, and even more preferably from 1 to 15 carbon atoms, and suitable examples include alkyl groups such as methyl groups, ethyl groups, propyl groups, butyl groups, pentyl groups, hexyl groups, heptyl groups, octyl groups, isopropyl groups, isobutyl groups, tert-butyl groups, neopentyl groups, and 2-ethylhexyl groups; alkenyl groups such as vinyl groups, allyl groups and propenyl groups; cycloalkyl groups such as cyclohexyl groups; aryl groups such as phenyl groups and tolyl groups; aralkyl groups such as benzyl groups and β-phenylpropyl groups; as well as groups in which either a portion of, or all of, the hydrogen atoms bonded to carbon atoms within the aforementioned groups have been substituted with halogen atoms or cyano groups or the like, such as chloromethyl groups, 3,3,3-trifluoropropyl groups, and 2-cyanoethyl groups. The $R^3$ groups are each independently an unsrubstituted or substituted monovalent hydrocarbon group, and include those which are exemplified as the unsrubstituted or substituted monovalent hydrocarbon group for said $R^2$. The $R^4$ group is a bivalent, trivalent or tetravalent hydrocarbon group, which may contain an ether linkage-forming oxygen atom therein, of 2 to 20 carbon atoms, preferably 2 to 12 carbon atoms. The $R^5$ group is a tetravalent hydrocarbon group, which may contain an ether linkage-forming oxygen atom therein, of 1 to 20 carbon atoms, preferably 5 to 20 carbon atoms.

Specific examples of the phosphite triester of the component (D) are shown below, although this is in no way a restrictive list.

Triethyl phosphite: $(EtO)_3P$, tris(2-ethylhexyl) phosphite: $[MeC_3H_6CH(Et)CH_2O]_3P$, trioctyl phosphite: $[Me(CH_2)_7 O]_3P$, triphenyl phosphite:

$(PhO)_3P$, diphenylmono(2-ethylhexyl) phosphite: $(PhO)_2 (MeC_3H_6CH(Et)CH_2O)P$, tris(2,4-di-tert-butylphenyl) phosphite:

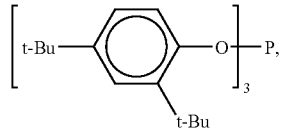

tetraphenyldipropylene glycol diphosphite: $(PhO)_2PO—[CH(Me)-CH_2O]_2—P(OPh)_2$, tetraphenyltetra(tridecyl)pentaerythritol tetraphosphite: $[(PhO)(C_{13}H_{27}O)P—OCH_2]_4C$, tetra(tridecyl)-4,4'-isopropylidenediphenyl diphosphite: $(C_{13}H_{27}O)_2PO\text{-}Ph\text{-}C(Me)_2\text{-}Ph\text{-}OP(OC_{13}H_{27})_2$, bis(tridecyl) pentaerythritol diphosphite:

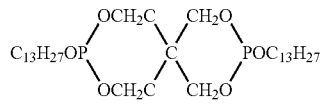

(wherein in each of the above formulas, Me, Et, Bu, and Ph represent a methyl group, an ethyl group, a butyl group, and a phenyl group or phenylene group, respectively).

These phosphite esters can be used singularly, or in combinations of two or more different compounds.

The quantity added of the phosphite triester of the component (D) is sufficient to provide at least 2 equivalents, and preferably 3 or more equivalents, of phosphorus (P) atoms relative to the platinum metal atoms within the component (C) (in other words, at least 2 mols, and preferably 3 or more mols, of phosphorus (P) atoms per 1 mol of platinum metal atoms). If this quantity is less than 2 equivalents, then the catalytic effect of the platinum based catalyst on the addition reaction at room temperature cannot be completely inhibited. There is no specific limit on the maximum quantity of the phosphite triester that can be added, as the upper limit varies depending on the ability of the phosphite triester to coordinate with the platinum metal atoms, and the oxidation capabilities of the component (E), although in order to ensure that the curability of the composition on heating is not impaired, the quantity is preferably set within a range from 2 to 10 equivalents.

(E) Organic Peroxide

An organic peroxide of the component (E) performs the function, together with the component (D) described above, of inhibiting the catalytic activity of the platinum based catalyst on the addition reaction, during long term storage of the composition at room temperature. Moreover, when the composition is cured under heating, this organic peroxide not only decomposes at its decomposition temperature, losing its inhibitory effect, but also oxidizes the component (D), thereby causing the component (D) to also lose its inhibitory effect, and accordingly, is able to ensure a rapid and reliable curing of the composition by the platinum based catalyst.

Suitable examples of this organic peroxide include ketone peroxides such as methyl ethyl ketone peroxide, cyclohexanone peroxide, methyl acetoacetate peroxide, and acetylacetone peroxide; peroxy ketals such as 1,1-bis(t-butylperoxy)-3,3,5-trimethylcyclohexane and 2,2-bis(t-butylperoxy) butane; hydroperoxides such as 1,1,3,3-tetramethylbutyl hydroperoxide, cumene hydroperoxide, and t-butyl hydroperoxide; dialkyl peroxides such as 2,5-dimethyl-2,5-bis(t-butylperoxy)hexane and di-t-butyl peroxide; diacyl peroxides such as 3,5,5-trimethylhexanoyl peroxide and m-toluoyl peroxide; peroxycarbonates such as di-isopropyl peroxydicarbonate and di-2-ethylhexyl peroxydicarbonate; and peroxy esters such as t-butylperoxy 3,5,5-trimethylhexanoate, t-butylperoxy isopropylmonocarbonate, t-butylperoxy 2-ethylhexylmonocarbonate, and t-butylperoxy benzoate. These peroxides can be used singularly, or in combinations of two or more different compounds.

The quantity added of the component (E) is calculated in terms of the number of peroxide linkages (—OO— linkages) within the organic peroxide that is used, and is typically at least 2 equivalents, and preferably 3 or more equivalents, relative to phosphorus atoms in the phosphite ester of the component (D) (in other words, at least 2 mols, and preferably 3 or more mols per 1 mol of phosphorus atoms in the phosphite ester in the case of an organic peroxide with one —OO— linkage, or at least 1 mol, and preferably 3/2 or more mols per 1 mol of phosphorus atoms the phosphite ester in the case of an organic peroxide with two —OO— linkages). If this quantity is less than 2 equivalents, then the catalytic effect of the platinum based catalyst on the addition reaction at room temperature cannot be completely inhibited, and when the composition is cured under heating, the catalytic action inhibitory effect of the component (D) cannot be completely deactivated. There is no specific limit on the maximum quantity of the organic peroxide that can be added, but because decomposition residues of the peroxide can effect the curing characteristics, the quantity is preferably limited to no more than 15 equivalents.

Other Components

In addition to the components (A) to (E) described above, other optional components may also be added to a composition of the present invention, including inorganic fillers such as fumed silica, crystalline silica, precipitated silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber. These fillers may also include fillers that have been subjected to surface treatment with an organosilicon compound such as an organoalkoxysilane compound, an organochlorosilane compound, an organosilazane compound, or a low molecular weight siloxane compound. Furthermore, silicone rubber powders or silicone resin powders may also be added.

Other optional components such as straight chain organopolysiloxanes containing alkenyl groups, organopolysiloxanes that contain no silicon atom bonded hydrogen atoms or alkenyl groups, heat resistance imparting agents, flame retardancy imparting agents, thixotropic improvement agents, pigments, and dyes may also be added to a composition of the present invention, provided such addition does not impair the effects of the present invention.

EXAMPLES

Example 1

A composition was prepared by mixing uniformly together:
(A) 100 parts of an organopolysiloxane having a molar ratio of $CH_2=CH(CH_3)_2SiO_{0.5}$ units/$(CH_3)_3SiO_{0.5}$ units/$(CH_3)_2SiO$ units/$CH_3SiO_{1.5}$ units=0.7 mol %/7 mol %/83.2 mol %/9.1 mol %, and with a viscosity at 25° C. of 2,000 mPa·s; (B) 10 parts of a dimethylpolysiloxane with terminals terminated with dimethylhydrogensiloxy groups, having a silicon atom bonded hydrogen atom (SiH) content of 0.068% by weight (number of SiH groups/number of vinyl groups within the component (A)=0.7); (C) 0.05 parts of a complex of chloroplatinic acid and 1,3-divinyltetramethyldisiloxane (platinum metal atom content: 1% by weight) (equivalent to 5 ppm of platinum metal atoms relative to the combined weight of (A)+(B)); (D) 0.0032 parts of tris(2-ethylhexyl) phosphite (a 3-fold equivalent relative to the platinum metal atoms within the component (C)); and (E) 0.012 parts of t-butylperoxy 3,5,5-trimethylhexanoate (a 6.5-fold equivalent relative to the component (D)). The thus obtained composition was then stored for 1 month at 40° C. in a sealed vessel, but absolutely no increase in viscosity was observed.

Subsequently, the composition was cured by heating at 130° C. for 30 minutes, and yielded a transparent gel product. Measurement of the hardness of this gel product in accordance with the penetration test method of JIS K 2220 (¼ cone) revealed a result of 20. Furthermore, when a sample of the composition obtained by mixing the above components (A) to (E) was subjected to heat curing immediately following preparation, using the same conditions as described above, the hardness of the thus obtained gel product was unchanged at 20.

Example 2

A composition was prepared by mixing uniformly together:
(A) 100 parts of an organopolysiloxane having a molar ratio of $CH_2=CH(CH_3)_2SiO_{0.5}$ units/$(CH_3)_3SiO_{0.5}$ units/$(C_6H_5)_2SiO$ units/$(CH_3)_2SiO$ units/$CH_3SiO_{1.5}$ units=0.85 mol %/0.9 mol %/2.1 mol %/94.65 mol %/1.5 mol %, and with a viscosity at 25° C. of 1,000 mPa·s, and 60 parts of a copolymer of dimethylsiloxane and diphenylsiloxane with terminals terminated with trimethylsiloxy groups, containing 3 mol % of diphenylsiloxane units, and with a viscosity at 25° C. of 700 mPa·s; (B1) 6.9 parts of a dimethylpolysiloxane with terminals terminated with dimethylhydrogensiloxy groups, having a silicon atom bonded hydrogen atom content of 0.068% by weight, and (B2) 12 parts of a dimethylpolysiloxane with 50% of the terminals terminated with dimethylhydrogensiloxy groups and the remaining terminals terminated with trimethylsiloxy groups, having a silicon atom bonded hydrogen atom content of 0.04% by weight (number of SiH groups within (B1)+(B2)/number of vinyl groups within the component (A)=0.9); (C) 0.05 parts of a complex of chloroplatinic acid and 1,3-divinyltetramethyldisiloxane (platinum metal atom content: 1% by weight) (equivalent to 5 ppm of platinum metal atoms relative to the combined weight of (A)+(B1)+(B2)); (D) 0.00235 parts of triphenyl phosphite (a 3-fold equivalent relative to the platinum metal atoms within the component (C)); and (E) 0.0075 parts of 1,1-bis(t-butylperoxy)-3,3,5-trimethylcyclohexane (a 6.5-fold equivalent relative to the component (D)).

The thus obtained composition was then stored for 1 month at 40° C. in a sealed vessel, but absolutely no increase in viscosity was observed.

Subsequently, the composition was cured by heating at 130° C. for 30 minutes, and yielded a transparent gel product. Measurement of the hardness of this gel product in accordance with the penetration test method of JIS K 2220 (¼ cone) revealed a result of 115. Furthermore, when a sample of the composition obtained by mixing the above components (A) to (E) was subjected to heat curing immediately following preparation, using the same conditions as described above, the hardness of the thus obtained gel product was unchanged at 115.

Example 3

A composition was prepared by mixing uniformly together:
(A) 100 parts of an organopolysiloxane having a molar ratio of $CH_2=CH(CH_3)_2SiO_{0.5}$ units/$(CH_3)_3SiO_{0.5}$ units/$(CH_3)_2SiO$ units/$CH_3SiO_{1.5}$ units=1.24 mol %/2.7 mol %/92.86 mol %/3.2 mol %, and with a viscosity at 25° C. of 400 mPa·s; (B) 8 parts of a dimethylpolysiloxane with terminals terminated with dimethylhydrogensiloxy groups, having a silicon atom bonded hydrogen atom content of 0.13% by weight (number of SiH groups/number of vinyl groups within the component (A)=0.6); (C) 0.05 parts of a complex of chloroplatinic acid and 1,3-divinyltetramethyldisiloxane (platinum metal atom content: 1% by weight) (equivalent to 5 ppm of platinum metal atoms relative to the combined weight of (A)+(B)); (D) 0.0032 parts of tris(2-ethylhexyl) phosphite (a 3-fold equivalent relative to the platinum metal atoms within the component (C)); (E1) 0.0064 parts of 1,1-bis(t-butylperoxy)-3,3,5-trimethylcyclohexane (a 5.5-fold equivalent relative to the component (D)); and (E2) 0.0024 parts of methyl acetoacetate peroxide (a 1-fold equivalent relative to the component (D)).

The thus obtained composition was then stored at 40° C. in a sealed vessel, and after 20 days had increased in viscosity markedly.

Subsequently, the composition was cured by heating at 130° C. for 30 minutes, and yielded a transparent gel product. Measurement of the hardness of this gel product in accordance with the penetration test method of JIS K 2220 (¼ cone) revealed a result of 87. Furthermore, when a sample of the composition obtained by mixing the above components (A) to (E) was subjected to heat curing immediately following preparation, using the same conditions as described above, the hardness of the thus obtained gel product was unchanged at 87.

Example 4

With the exception of also adding 2 parts by weight of a hydrophobic silica with a specific surface area of 170 m²/g, which had been surface treated with hexamethyldisilazane and comprised trimethylsilyl groups at the surface, a uniform composition was prepared in the same manner as the example 2.

The thus obtained composition was then stored for 1 month at 40° C. in a sealed vessel, but absolutely no increase in viscosity was observed.

Subsequently, the composition was cured by heating at 130° C. for 30 minutes, and yielded a transparent gel product. Measurement of the hardness of this gel product in accordance with the penetration test method of JIS K 2220 (¼ cone) revealed a result of 110. Furthermore, when a sample of the composition obtained by mixing the above components (A) to (E) and the hydrophobic silica stated above was subjected to heat curing immediately following preparation, using the same conditions as described above, the hardness of the thus obtained gel product was unchanged at 110.

Comparative Example 1

With the exception of not using the 0.0019 parts of t-butylperoxy 3,5,5-trimethylhexanoate of the component (E), a uniform composition was prepared in the same manner as the example 1. The composition was heated at 130° C. for 30 minutes, but did not cure.

Comparative Example 2

With the exception of using 0.0011 parts of tris(2-ethylhexyl) phosphite as the component (D) (a 1-fold equivalent relative to the platinum metal atoms within the component (C)), and not using the 0.012 parts of t-butylperoxy 3,5,5-trimethylhexanoate of the component (E), a uniform composition was prepared in the same manner as the example 1.

The thus obtained composition had gelled after standing for 24 hours at 25° C., and the gel product had a penetration value of 20.

Comparative Example 3

With the exception of using 0.0018 parts of t-butylperoxy 3,5,5-trimethylhexanoate as the component (E) (a 1-fold equivalent relative to the component (D)), a uniform composition was prepared in the same manner as the example 1. The composition was heated at 130° C. for 30 minutes, but did not cure.

The present invention enables a conventional one-part organopolysiloxane composition comprising an organohydrogenpolysiloxane having hydrogen atoms bonded to silicon atoms at the molecular chain terminals, a branched organopolysiloxane with aliphatic unsaturated groups bonded to silicon atoms, and a platinum based catalyst for accelerating the addition reaction between the two components, which represents a composition for which long term storage at room temperature has been impossible, to be imparted with long term storage stability, even if the composition also comprises an inorganic filler, and moreover, the present invention has absolutely no effect on the curability of the composition under heating.

What is claimed is:

1. A one-part organopolysiloxane gel composition comprising:
   (A) 100 parts by weight of an organopolysiloxane consisting of from 80.0 to 97.0 mol % of R(CH$_3$)SiO units, from 1.0 to 10.0 mol % of RSiO$_{1.5}$ units, from 0.1 to 4.0 mol % of (CH$_3$)$_2$(CH$_2$=CH)SiO$_{0.5}$ units, and from 0.5 to 10 mol % of (CH$_3$)$_3$SiO$_{0.5}$ units [wherein, a total of said units is 100 mol %, and in each unit formula representing said units, R represents a methyl group, a phenyl group, or a group represented by a formula RfCH$_2$CH$_2$— (wherein Rf is a perfluoroalkyl group that contains or does not contain an ether linkage-forming oxygen atom within a chain)], in which a plurality of said R groups within a single molecule are either identical or different;
   (B) an organohydrogenpolysiloxane having at least two units represented by a formula H(R$^1$)$_2$SiO$_{0.5}$ within each molecule [wherein, each R$^1$ represents, independently, an unsubstituted or substituted monovalent hydrocarbon group other than an alkenyl group], in sufficient quantity that a number of hydrogen atoms bonded to silicon atoms within this component is within a range from 0.5 to 4.0 atoms for each vinyl group within said organopolysiloxane of said component (A);
   (C) an effective quantity of a platinum based catalyst;
   (D) a phosphite triester in sufficient quantity to provide at least 2 equivalents relative to platinum metal atoms within said component (C); and
   (E) an organic peroxide in sufficient quantity to provide at least 2 equivalents relative to said component (D).

2. The composition according to claim 1, wherein said phosphite triester is a compound represented by a general formula:

$$P(OR^2)_3$$

[wherein, each R$^2$ represents, independently, at least one group selected from the group consisting of unsubstituted and substituted monovalent hydrocarbon groups, and groups of a formula —R$^4$—[—O—P(OR$^3$)$_2$]$_x$ (wherein R$^3$ are each independently an unsubstituted or substituted monovalent hydrocarbon group, x is an integer of 1 to 3, and R$^4$ is a bivalent, trivalent or tetravalent hydrocarbon group of 2 to 20 carbon atoms that contains or does not contain an ether linkage-forming oxygen atom within the chain)], or a compound represented by a general formula:

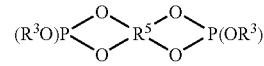

[wherein R$^3$ are as defined above, and R$^5$ is a tetravalent hydrocarbon group of 1 to 20 carbon atoms that contains or does not contain an ether linkage-forming oxygen atom within the chain)].

3. The composition according to claim 1, wherein a quantity of said RSiO$_{1.5}$ units within said component (A) is from 1.5 to 10.0 mol %.

4. The composition according to claim 1, wherein a viscosity at 25° C. of said component (A) is within a range from 300 to 10,000 mPa·s.

5. The composition according to claim 1, wherein said component (B) is a dimethylpolysiloxane with both molecular chain terminals terminated with dimethylhydrogensiloxy groups.

6. The composition according to claim 1, wherein said component (D) is triethyl phosphite: (EtO)$_3$P, tris(2-ethylhexyl) phosphite: [MeC$_3$H$_6$CH(Et)CH$_2$O]$_3$P, trioctyl phosphite: [Me(CH$_2$)$_7$O]$_3$P, triphenyl phosphite: (PhO)$_3$P, diphenylmono(2-ethylhexyl) phosphite: (PhO)$_2$(MeC$_3$H$_6$CH(Et)CH$_2$O)P, tris(2,4-di-tert-butylphenyl) phosphite:

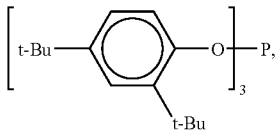

tetraphenyldipropylene glycol diphosphite: (PhO)$_2$PO—[CH(Me)—CH$_2$O]$_2$—P(OPh)$_2$, tetraphenyltetra(tridecyl) pentaerythritol tetraphosphite: [(PhO)(C$_{13}$H$_{27}$O)P—OCH$_2$]$_4$C, tetra(tridecyl)-4,4'-isopropylidenediphenyl diphosphite: (C$_{13}$H$_{27}$O)$_2$PO—Ph—C(Me)$_2$—Ph—OP(OC$_{13}$H$_{27}$)$_2$, bis(tridecyl)pentaerythritol diphosphite:

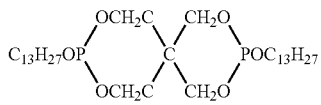

(wherein in each of the above formulas, Me, Et, Bu, and Ph represent a methyl group, an ethyl group, a butyl group, and a phenyl group or phenylene group, respectively), or a mixture of two or more thereof.

7. The composition according to claim 1, wherein said component (E) is a ketone peroxide, a peroxy ketal, a hydroperoxide, a dialkyl peroxide, a diacyl peroxide, a peroxycarbonate, a peroxy ester, or a combination of two or more thereof.

8. The composition according to claim 1, wherein said component (E) is methyl ethyl ketone peroxide, cyclohexanone peroxide, methyl acetoacetate peroxide, acetylacetone peroxide, 1,1-bis(t-butylperoxy)-3,3,5-trimethylcyclohexane, 2,2-bis(t-butylperoxy)butane, 1,1,3,3-tetramethylbutyl hydroperoxide, cumene hydroperoxide, t-butyl hydroperoxide, 2,5-dimethyl-2,5-bis(t-butylperoxy)hexane, di-t-butyl peroxide, 3,5,5-trimethylhexanoyl peroxide, m-toluoyl peroxide, di-isopropyl peroxydicarbonate, di-2-ethylhexyl peroxydicarbonate, t-butylperoxy 3,5,5-trimethylhexanoate, t-butylperoxy isopropylmonocarbonate, t-butylperoxy 2-ethylhexylmonocarbonate, t-butylperoxy benzoate, or a combination of two or more thereof.

9. The composition according to claim 1, further comprising a dimethylpolysiloxane in which one molecular chain terminal is terminated with a trimethylsiloxy group, and another terminal is terminated with a dimethylhydrogensiloxy group.

10. The composition according to claim 1, further comprising a copolymer of dimethylsiloxane and diphenylsiloxane with both molecular chain terminals terminated with trimethylsiloxy groups.

11. The composition according to claim 1, further comprising a hydrophobic silica that has been surface treated using hexamethyldisilazane and comprises trimethylsilyl groups at said surface.

12. The composition according to claim 1, wherein a viscosity of 25° C. of said component (B) is within a range from 0.5 to 500 mPa·s.

* * * * *